Sept. 17, 1940.  E. A. JOHNSTON  2,214,818
TRACTOR MOUNTED HARVESTER
Filed Nov. 18, 1937  3 Sheets-Sheet 1
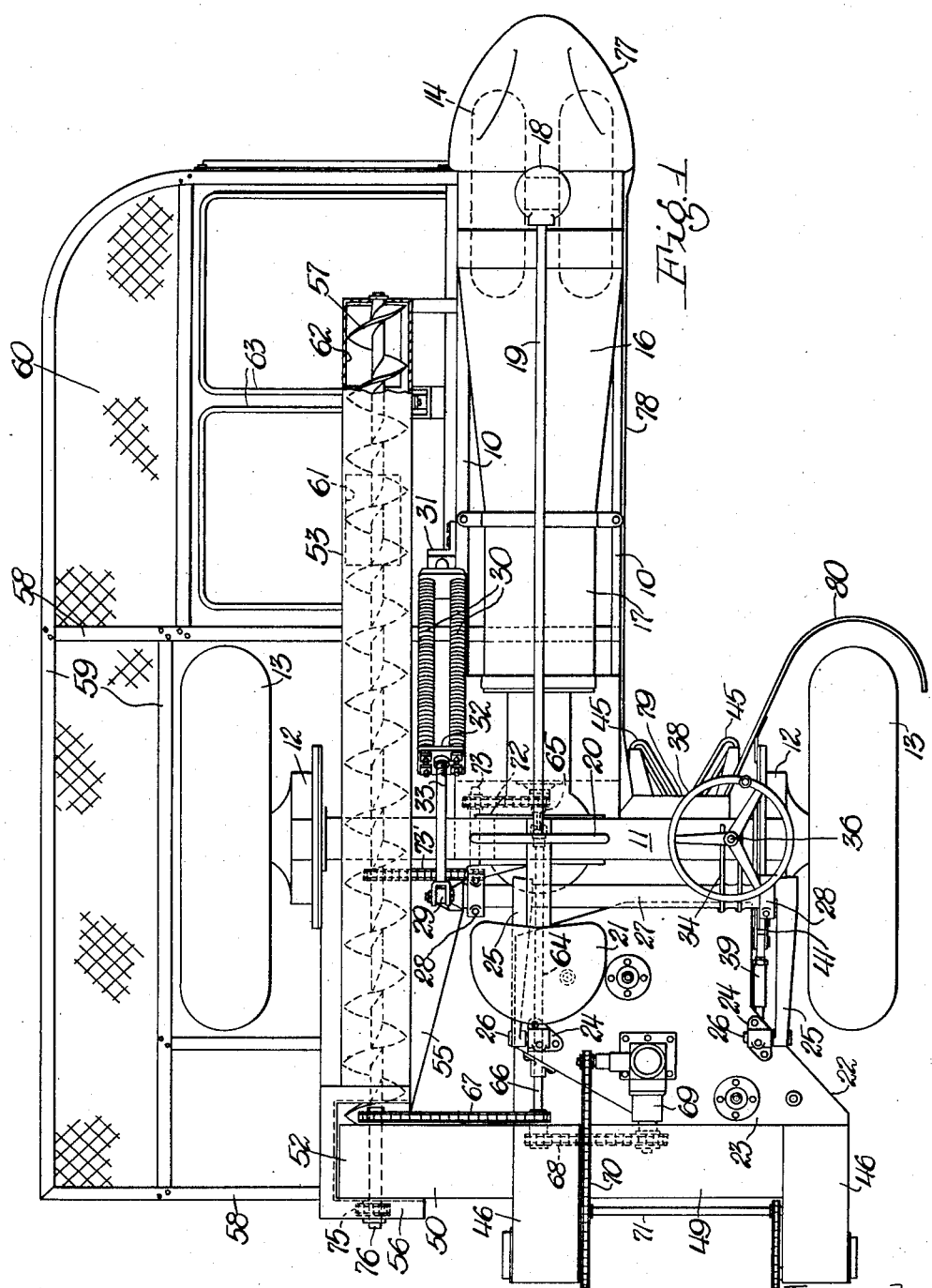

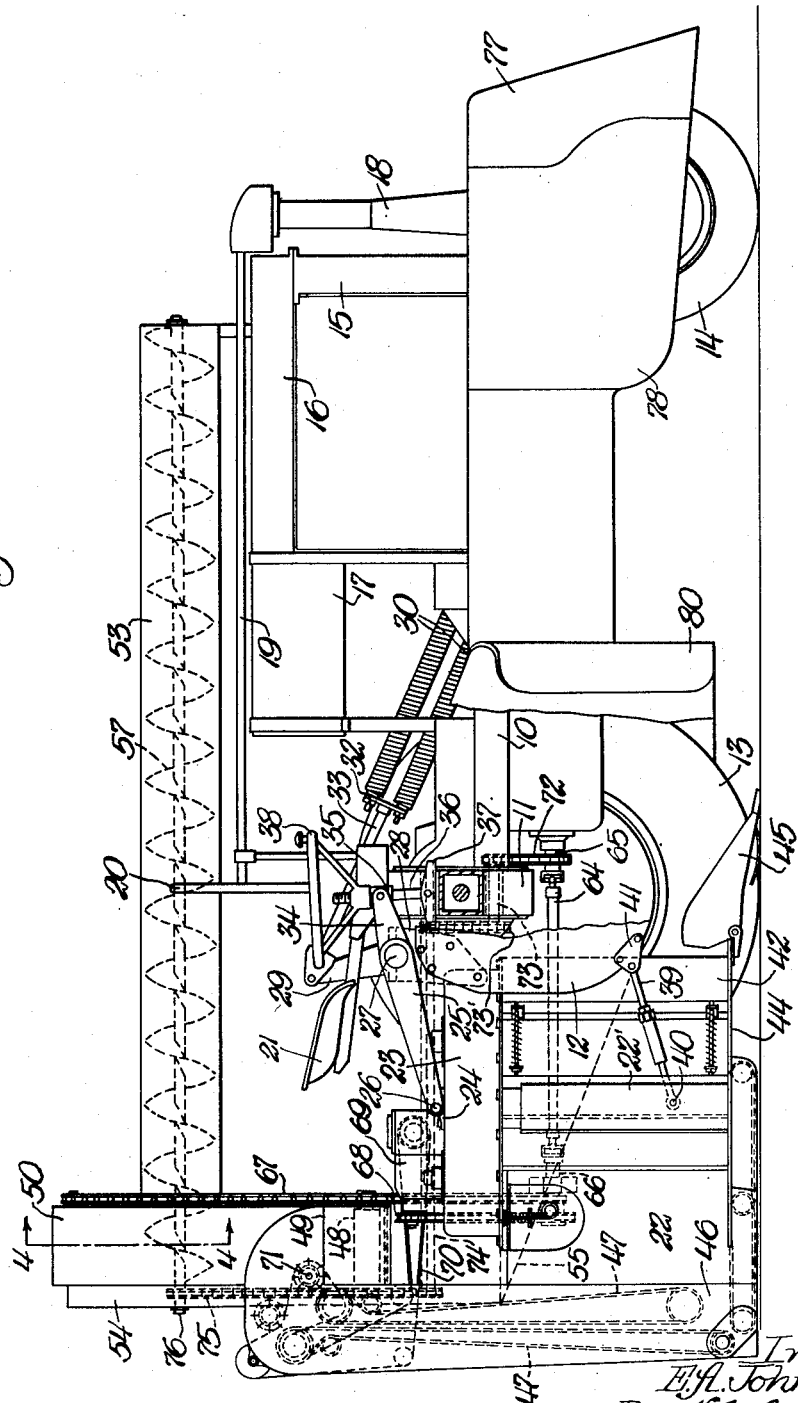

Sept. 17, 1940.  E. A. JOHNSTON  2,214,818
TRACTOR MOUNTED HARVESTER
Filed Nov. 18, 1937  3 Sheets-Sheet 3
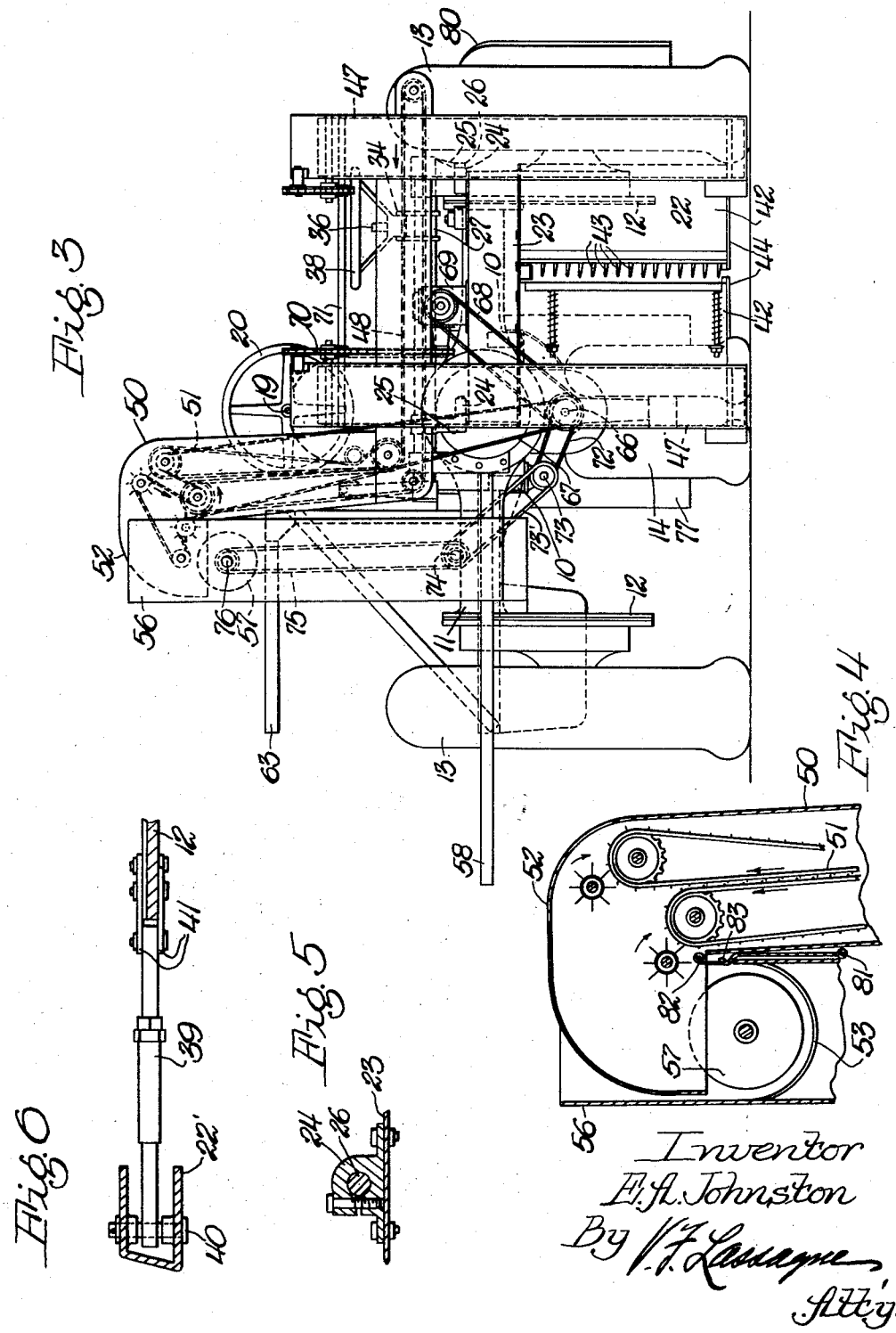

Patented Sept. 17, 1940

2,214,818

UNITED STATES PATENT OFFICE 2,214,818

TRACTOR MOUNTED HARVESTER

Edward A. Johnston, Chicago, Ill., assignor to International Harvester Company, a corporation of New Jersey Application November 18, 1937, Serial No. 175,199

26 Claims. (Cl. 56—14)

This invention relates to a tractor attached implement. More specifically it relates to a tractor mounted and operated cotton harvester.

The principal object of the invention is to provide an improved mounting for a harvester unit directly on a tractor.

Another object is to provide an improved close-coupled mounting of a harvesting unit at the rear of a tractor.

Another more specific object is to provide a supporting and adjusting linkage for a harvester unit, by means of which it may be floatingly mounted for a movement of translation at the rear of the tractor.

Another specific object is to provide plant engaging means for a harvesting unit at the rear of a tractor, which means extend underneath the rear axle of the tractor, whereby gauging is determined by the rear wheels of the tractor.

Another object is to provide a bagging platform at the forward end of the tractor and conveying means extending from the harvesting unit at the rear of the tractor forwardly to the bagging means.

Another object is to provide an operator's platform extending substantially the entire length of the tractor, whereby during operation the operator may move lengthwise of the tractor to enable inspection of the entire harvesting unit and its associated part.

Another object is to provide a drive mechanism from a tractor power take-off shaft for operating a harvesting unit mounted for adjustment with respect to the tractor and for operating a conveying unit mounted rigidly on the tractor.

The above objects and others, which will be apparent from the detailed description to follow, are accomplished by mounting of a harvesting unit, a bagging platform and conveying mechanism on a tractor of the general purpose, tricycle type, as illustrated in the drawings. The harvesting unit is mounted directly behind the rear axle structure of the tractor and is supported by a linkage, which provides for vertical adjustment with substantially a movement of translation. The gathering means, which are carried by the harvester unit, extend forwardly under the rear axle structure, whereby the point of engagement with the plants is determined and gauged by the rear wheels. A lateral frame extension on the tractor supports the operator's platform alongside the tractor, the conveying means extending forwardly from the harvester unit at the rear, and the bagging means at the forward end of the tractor. The necessary drives are provided, as will be hereinafter described. A receiving means is provided on the conveying means to permit adjustment of the picker unit without affecting delivery of the harvested material to the conveyer. The entire combination of parts is located on the tractor in a compact manner and arranged to provide a unitary, well balanced, structure.

In the drawings:

Figure 1 is a plan view of a tractor with a harvester embodying the invention mounted thereon;

Figure 2 is a side elevation of the structure shown in Figure 1;

Figure 3 is a rear elevation of the structure shown in Figure 1;

Figure 4 is a transverse, vertical section, substantially on the line 4—4 of Figure 2, showing structure providing for relative movement between the harvester unit and the conveying means;

Figure 5 is a vertical section showing the pivotal connection between one of the adjusting arms and the attaching bracket mounted on the harvesting unit; and, Figure 6 is a transverse sectional view, showing the stabilizing link which connects the harvester unit with the frame structure of the tractor.

In the drawings a tractor of the general purpose type has been illustrated. Said tractor has a narrow longitudinally extending body portion 10, a transverse rear axle structure 11, depending housings 12 at the ends of said axle structure, traction wheels 13 carried by said depending housings, and a front rolling support in the form of a pair of closely spaced wheels 14. As illustrated, the tractor is provided with pneumatic tires. It will be noted that the rear wheels are widely spaced and are adapted to straddle two adjacent rows of plants. The closely spaced front wheels 14 are adapted to operate between the rows of plants straddled by the rear wheels. The drawings also show diagrammatically certain other parts of the tractor. A radiator casing 15 at the forward end of the tractor is connected by a hood 16 with the rear portion of the tractor at which a gasoline tank 17 is mounted. A steering column supporting structure 18 is shown at the forward end of the tractor. A steering rod 19 connected with said structure extends rearwardly to the operator's station at the rear of the tractor. A steering wheel 20 is mounted on the rod 19 in a position to be engaged by an operator on the seat 21.

The harvesting unit, which in the illustration is a cotton picker housing, will be referred to in its entirety by the numeral 22. Said housing has not been shown in detail except as to its outside construction. Neither has the picking mechanism been illustrated in detail, as said mechanism constitutes the subject-matter of applicant's copending application, Serial No. 135,303, filed April 6, 1937. Said harvesting unit is built from a main top casting 23. Said casting forms the rigid portion of the structure to which all of the other elements are attached. At laterally spaced points on the top of the casting 23, supporting brackets 24 are rigidly secured in position. The brackets are spaced in a fore and aft direction, so that the transverse line of support is substantially on the center of gravity of the harvesting unit.

Lifting arms 25 are pivotally connected to pins 26 clamped to the brackets 24 and lying in alinement on a transverse axis. The lifting arms 25 are rigidly secured to a transverse rock-shaft 27. Said rock-shaft is pivotally supported by brackets 28 secured to portions of the depending housings 12. An upwardly extending actuating arm or crank 29 provides means for connecting a spring balancing mechanism to the rock-shaft. Said mechanism includes a plurality of tension springs 30 connected at their forward ends to a bracket 31, which is secured at a forward point to the body portion 10 of the tractor. The springs extend upwardly and rearwardly and are connected at their rear ends to a plate 32, which is adjustably joined by means of a threaded connection with a link 33. Said link is pivotally connected to the upper end of the arm 29. The balancing springs 30 are provided to substantially balance the weight of the harvesting unit in its reaction on the rock-shaft 27. This provides for easy manual adjustment to vary the vertical position of the harvesting unit, as will now be described.

An adjusting arm 34 rigidly connected to the rock-shaft 27 extends forwardly and is connected to the trunnions of a pivot block 35. Said pivot block is slidably mounted on an adjusting rod 36. Said rod is pivotally connected to a bracket 37 secured to the rear axis structure 11 of the tractor. A hand wheel 38, threaded on the upper end of the rod 36, abuts the upper side of the pivot block 35. Said adjustment determines the lowermost position of the harvesting unit when freely supported. The provision of relative sliding movement of the block 35 with respect to the rod 36 permits upward movement of the harvesting unit when irregularities in the ground surface are encountered tending to exert upward pressure against the unit. The balancing springs 30 support substantially the entire weight of the unit whereby it may float upwardly when obstructions are encountered.

The upper casting 23, as previously stated, forms the principal support for the entire harvesting unit. The vertical walls of the unit and the bottom plate will not be described in detail. Along one side of the harvesting unit 22, a vertical channel 22' is rigidly secured. Said channel is one of a number of reenforcing members for the depending walls of the unit. A stabilizing link 39 extends within the channel 22', which is open toward the front, and is pivotally secured therein by a pin 40. Said link extends upwardly and forwardly substantially parallel to the lifting arms 25, and is pivotally connected to a bracket 41 secured to one of the depending housings 12. The link 39 is adjustable, as illustrated, to provide for vertical alinement of the picker housing after adjustment on the tractor, and for different conditions of operation. The arrangement of said stabilizing link in parallel relation with respect to the lifting arms provides a vertical movement of translation during manual adjusting, or during floating movement of the harvesting unit.

The harvesting unit, which has been previously referred to as being of a unitary construction, includes spaced picker housings 42 secured to and depending downwardly from the casing 23. Said housings are spaced apart to provide a throat, through which the cotton plants pass for engagement with the picking mechanism. Each of the housings 42 contains picking mechanism of the rotating spindle type, spindles 43 being shown in Figure 3. The picking mechanism may be of any type insofar as the present invention is concerned. The co-pending application above referred to discloses a suitable picking mechanism.

Bottom plates 44 are shown at the lower extremity of each of the housings 42. Said plates extend forwardly, as best shown in Figure 2, to provide means for mounting plant gathering and guiding shoes 45. Said shoes are pivotally mounted on the forward ends of the bottom plates 44. As shown in Figure 2, the gathering and guiding shoes are in substantially transverse alignment with the rear traction wheels which provide gauge means substantially in alinement with the points at which the shoes engage the ground and the plants.

The cotton plants are guided by the shoes 45 into the throat of the machine formed by the spaced housings 42. The picking mechanisms in the housings operate on opposite sides of the plant, removing cotton therefrom. Cotton doffed from the picking spindles is delivered to the elevating means contained in the vertical housings 46 mounted at the rear of the housings 42. Said housings extend upwardly above the top casting 23 of the harvesting unit. Vertical conveyers 47, as shown in dotted lines in Figure 2, carry the cotton upwardly and discharge it onto a transverse conveyer 48 located in a transverse housing 49.

As shown in Figure 3, the conveyer 48 extends upwardly through a vertical housing 50 cooperating with a second conveyer belt 51. The cotton carried upwardly between said conveyer belts, as shown in the enlarged view of Figure 4, is discharged laterally, being deflected by a hood 52 secured to the top of the housing 50 and is discharged downwardly. Up to the present point of the description of the cotton conveying means, all of the conveyers and the enclosing housings described are carried by the harvesting unit. The remaining portions of the handling means are carried on the tractor independently of the adjustable harvesting unit.

A longitudinal conveyer housing 53 is located along one side of the tractor, extending from the rear end adjacent the hood 52 to a point adjacent the front end of the tractor. At the rear end of the tractor the conveyer housing 53 is supported on a vertically extending structure 54, which is secured to a rearwardly extending frame structure 55 rigidly secured by any suitable means to the rear axle structure of the tractor. At the upper end of the supporting structure 54, a receiving hopper 56 is formed, into which the hood 52 discharges. A spiral conveyer 57 mounted in the housing 53 receives cotton from the hood 52 and moves it forwardly to the front end of the housing 53.

An operator's platform is secured to the side of the tractor opposite the location of the harvesting unit. Said platform is made up of a plurality of transversely extending angle bars 58, to which are secured a plurality of longitudinally extending angle bars 59. A suitable floor 60 of metal is secured to the angle bars to provide a platform. The operator may move on said platform from the rear of the tractor adjacent the harvesting unit to a forward position at which bagging means are located.

The conveyer housing 53 is provided at the forward end with spaced outlets 61 and 62. Said outlets provide means for discharging cotton into receiving bags secured to either of two hoops 63. Suitable means may be provided for securing the bags and for closing one of the outlets 62 when cotton is to be discharged from the other.

To provide driving means for the harvesting unit, a drive shaft 64 is secured by a universal joint to a power take-off shaft 65 extending rearwardly from the tractor transmission below the rear axle structure. The shaft 64 is connected by a universal joint with a drive shaft 66 shown in dotted lines in Figure 2. From said shaft, power is transmitted by a drive chain 67 to the conveyer mechanism, particularly the conveyer belts 48 and 51. By means of a drive chain 68, power is transmitted from the shaft 66 to a gear box 69 mounted on the casting 23. From said gear box power is transmitted by means of a chain 70 to a transverse shaft 71, which supplies driving power for the vertical conveyers 47 at the rear of the harvesting unit. Through means not shown in this application, power is also transmitted from the gear box 69 to the picking mechanisms within the housings 42.

A gear mounted on the power take-off shaft 65 supplies power through a chain 72 to an auxiliary shaft 73 mounted below the rear axle structure. From said shaft power is transmitted by means of a chain 73' to a longitudinally extending shaft 74. Said shaft extends rearwardly to provide drive mechanism for the spiral conveyer 57. A drive chain 75 extends vertically upwardly from a sprocket on the shaft 74 to a drive sprocket on a shaft 76, which forms an axle for the spiral conveyer.

To provide shields for deflecting the cotton plants, a rounded fender member 77 is secured to the forward end of the tractor. Said member is provided at the side of the harvesting unit with a rearwardly extending fender portion 78 connected to the side of the tractor and extending to the rear axle structure. A transverse rounded fender member 79 is secured over the front of the axle structure, as shown in Figure 1. A wheel fender 80, secured to a portion of the depending housing 12 at the side of the harvesting unit, extends forwardly and outwardly around the wheel 13 at that side, to deflect the cotton plants under the axle structure and into the throat of the machine.

The operation of the harvester unit as above described has been explained in connection with the description. The principal features are the floating adjustable mounting for the harvesting unit at the rear of the tractor in close coupled relation with respect thereto, whereby the plant gathering means may extend under the axle structure and be gauged by the rear wheels.

Another principal feature is to support the picker housing as close to the rear axle as possible to effect a satisfactory weight balance. Another principal feature is the provision of means for delivering the cotton from the floating part of the machine, namely the harvester unit, into the stationary portion,—that is, the portion fixed on the tractor. This feature is clearly shown in Figure 4. It will be noted that a flexible apron 81, secured by a transverse pin 82 to the hood portion 52, hangs downwardly between a transverse pin 83 on the receiving hopper 56 and an adjacent wall of said hopper. Said flexible apron is weighted at the lower end to maintain its position during vertical adjustment of the harvesting unit with respect to the receiving hopper 56.

It is to be understood that applicant has shown and described only a preferred embodiment of his improved tractor mounted harvesting unit and that he claims as his invention all modifications of machines for harvesting cotton or other crops falling within the scope of the appended claims.

What is claimed is:

1. A tractor mounted harvesting machine for a tractor having a wide tread axle structure, and in combination therewith a housing containing a harvesting mechanism positioned back of the rear axle structure in close proximity thereto, means for supporting the housing entirely on the tractor, said means including means for adjusting the housing vertically with respect to the tractor, and plant guiding means carried by the housing and extending forwardly under the rear axle.

2. A tractor mounted harvesting machine for a tractor having a wide tread axle structure, and in combination therewith a housing containing harvesting mechanisms positioned back of the rear axle structure in close proximity thereto, means for supporting the housing entirely on the tractor, said means including means for adjusting the housing vertically with respect to the tractor, and plant guiding and gathering means carried by the housing and extending forwardly under the rear axle, said means being positioned to engage the plants substantially in transverse alinement with the rear wheels whereby said wheels function as a gauge means for the guiding and gathering means.

3. A tractor mounted harvesting machine for a tractor having a wide tread axle structure, and in combination therewith a housing containing a harvesting mechanism positioned back of the rear axle structure in close proximity thereto, said housing including depending transversely spaced portions to form a throat for the passage of plants to be operated upon, means for supporting the housing entirely on the tractor, said means including means for adjusting the housing vertically with respect to the tractor, and plant guiding means carried by the housing and extending forwardly under the rear axle.

4. A tractor mounted harvesting machine for a tractor having a wide tread high clearance axle structure, and in combination therewith a housing containing harvesting mechanisms positioned back of the rear axle structure in close proximity thereto, said housing including a top portion and portions depending downwardly therefrom spaced to form a throat for the passage of plants, the top portion being positioned at such a height that the top of the throat has substantially the same clearance as the axle structure of the tractor, means for supporting the housing entirely on the tractor, said means including means for adjusting the housing vertically with respect to the tractor, and plant guiding means carried by the housing and extending forwardly under the rear axle.

5. A tractor mounted cotton picker for a tractor having a wide tread rear axle structure, and in combination therewith a picker housing positioned back of the rear axle structure in close proximity thereto, an adjustable transverse rock-shaft mounted on the axle structure, transversely spaced lifting arms extending rearwardly from said shaft, said arms being pivotally connected to the picker housing, and a stabilizing link spaced vertically from the lifting arms connected to the picker housing and to the axle structure.

6. A tractor mounted cotton picker for a tractor having a wide tread rear axle structure, and in combination therewith a picker housing positioned immediately back of the rear axle structure, an adjustable transverse rock-shaft mounted on the axle structure, transversely spaced lifting arms extending rearwardly from said shaft, said arms being pivotally connected to the picker housing, a stabilizing link spaced vertically from the lifting arms connected to the picker housing and to the axle structure, and plant gathering and guiding means carried by the picker housing, said means extending under the rear axle structure and being positioned to engage the ground substantially in transverse alinement with the rear wheels.

7. A tractor mounted cotton picker for a tractor having a wide tread rear axle structure, and in combination therewith a picker housing positioned back of the rear axle structure in close proximity thereto, an adjustable transverse rock-shaft mounted on the axle structure, transversely spaced lifting arms extending rearwardly from said shaft, said arms being pivotally connected to the picker housing, and an adjustable stabilizing link connected to the picker housing and to the axle structure, said link being substantially parallel to the lifting arms.

8. A tractor mounted cotton picker for a tractor having a wide tread rear axle structure, and in combination therewith a picker housing positioned immediately back of the rear axle structure in close proximity thereto, a transverse rock-shaft mounted on the axle structure, transversely spaced lifting arms extending rearwardly from said shaft, said arms being pivotally connected to the picker housing, spring means connected to said rock-shaft for substantially balancing the weight of the picker housing, manually operable means for adjusting the position of the rock-shaft to adjust the picker housing vertically, and a stabilizing link connected to the picker housing and to the axle structure.

9. A tractor mounted cotton picker for a tractor having a wide tread rear axle structure with drive wheels mounted thereon, and in combination therewith a picker housing positioned back of the rear axle structure in close proximity thereto, an adjustable transverse rock-shaft mounted on the axle structure, transversely spaced lifting arms extending rearwardly from said shaft, said arms being pivotally connected to the picker housing, and an adjustable stabilizing link connected to the picker housing and to the axle structure, said link being substantially parallel to the lifting arms, and plant gathering and guiding means pivotally connected to the picker housing and positioned to engage the ground in transverse alinement with the wheels.

10. A tractor mounted cotton picker for a tractor having a wide tread axle structure and depending final drive housings, and in combination therewith a picker housing positioned immediately back of the rear axle structure in close proximity thereto, an adjustable transverse rock-shaft mounted on the axle structure, transversely spaced lifting arms extending rearwardly from said shaft, said arms being pivotally connected to the picker housing, and a stabilizing link connected to the picker housing and to one of the final drive housings.

11. A tractor mounted cotton picker for a tractor having a wide tread arched rear axle housing structure with depending housings at the ends thereof, and in combination therewith a picker housing positioned back of the rear axle structure in close proximity thereto, a transverse rock-shaft adjustably mounted on the axle structure, transversely spaced lifting arms extending rearwardly from said shaft, said arms being pivotally connected to the picker housing near the center of gravity in the fore and aft direction, and an adjustable stabilizing link connected to the picker housing and to one of the depending housings of the axle structure, said link being substantially parallel to the lifting arms whereby the picker housing is adjusted vertically with substantially a movement of translation.

12. A tractor mounted cotton picker for a tractor having a wide tread rear axle structure with drive wheels mounted thereon, and in combination therewith a picker housing positioned immediately back of the rear axle structure, transversely spaced lifting arms mounted on the tractor and extending rearwardly therefrom, said arms being pivotally connected to the picker housing, and a stabilizing link connected to the picker housing and to the axle structure, said link being substantially parallel to the lifting arms, and plant gathering and guiding means pivotally connected to the picker housing and positioned to engage the ground and the plants substantially in transverse alinement with the wheels.

13. In a tractor mounted cotton picker for a tractor having a narrow body and a wide tread rear axle structure and in combination therewith a picker housing mounted directly back of the axle structure for vertical adjustment with respect thereto, a conveyor housing for a picked cotton conveyor extending laterally from said housing and rigid with respect thereto, a longitudinally positioned conveyor housing mounted on the tractor along one side of the body and extending forwardly from adjacent the first named conveyor housing to a forward point on the tractor, means for delivering cotton from the lateral conveyor housing to the longitudinal conveyor housing, and a bagging platform secured to the tractor body and extending laterally therefrom beneath the forward end of the longitudinal conveyor housing.

14. In a tractor mounted cotton picker for a tractor having a narrow body and a wide tread rear axle structure and in combination therewith a picker housing mounted directly back of the axle structure for vertical adjustment with respect thereto, an extension housing for a picked cotton conveyor carried by the picker housing extending upwardly therefrom, a longitudinally positioned conveyor housing mounted on the tractor with one end positioned adjacent the first named conveyor housing, means including a hopper on the conveyor housing and a lateral projection on the extension housing for delivering picked cotton to the conveyor housing, and a bagging platform secured to the tractor body adjacent the discharge end of the conveyor.

15. In a tractor mounted cotton picker for a tractor having a narrow body and a wide tread rear axle structure for straddling two rows of plants and in combination therewith a picker housing mounted directly back of the axle structure for vertical adjustment with respect thereto, said housing being formed with a throat in alinement with one of the straddled rows for the passage of cotton plants to be operated upon, a picked cotton conveyor housing carried by the picker housing extending upwardly therefrom, a longitudinally positioned conveyor housing mounted on the tractor with one end positioned adjacent the first named conveyer housing, means including a hopper on the conveyer housing and a lateral projection on the extension housing for delivering picked cotton to the conveyer housing, and a bagging platform secured to the tractor body adjacent the discharge end of the conveyer.

16. In a tractor cotton picker for a tractor of the tricycle type having a wide rear axle structure adapted to straddle two rows of plants, a narrow body portion and a front support adapted to pass between the rows, and in combination therewith a rock-shaft mounted for oscillation on the rear axle structure, laterally spaced lifting arms secured to said shaft and extending rearwardly therefrom, a picker housing located back of the axle structure in close proximity thereto, means for pivotally connecting the lifting arms to the housing adjacent its center of gravity in the fore and aft direction, a balance arm secured to the rock-shaft, spring means secured to said arm, said means being positioned to oppose and substantially balance the torque action of the housing on the rock-shaft, and manual means for adjusting the position of the rock-shaft.

17. A device as set forth in claim 15 in which a stabilizing link is connected to the picker housing and to the tractor spaced from the lifting arms and substantially parallel thereto, whereby the picker housing is adjusted vertically with a substantial movement of translation.

18. In a row crop tractor having a transverse rear axle housing and widely spaced rear wheels, and a longitudinal centrally disposed body, the combination with the rear axle housing of a harvester carried thereby in close proximity thereto so as to gather at a point adjacent the housing, and a substantially longitudinally disposed crop conveyer mounted on the tractor between the body and a wheel, said conveyer extending from a point rearwardly of the axle housing to a point adjacent the forward end of the tractor.

19. In a row crop tractor having a transverse rear axle housing and widely spaced rear wheels, and a longitudinal centrally disposed body, the combination with the rear axle housing of a harvester carried thereby, said harvester being disposed at the rear of the tractor and including a crop handling means disposed along one side of the tractor, and an attendant's platform disposed adjacent the same side of the tractor and extended substantially throughout the length of the tractor.

20. In combination, a tractor having a wide tread rear axle structure, a cotton picker mechanism mounted in close proximity thereto at one side of the tractor, a conveyor positioned at the other side of the tractor and extending a substantial portion of the length thereof, and means for transferring cotton from the picker mechanism to the conveyor.

21. In combination, a tractor having a wide tread rear axle structure and cotton picking mechanism positioned adjacent the rear axle structure and adapted to pick cotton at a point substantially beneath said structure.

22. In combination, a tractor having a rear axle structure and gathering mechanism mounted on the tractor and positioned in close proximity to the rear axle structure so as to gather at a point adjacent the structure.

23. In combination, a tractor having a rear axle structure and wheels therefor, and a cotton gathering mechanism mounted on the tractor and positioned near the rear axle structure substantially in transverse alinement with the wheel so as to gather at a point in close proximity to said structure.

24. In combination, a tractor having a framework, a cotton harvester unit positioned at the rear of the tractor, a shaft supported by the framework, arms connecting the harvester unit and the shaft, and a stabilizing link connecting the harvester unit and the tractor at a point substantially below the framework.

25. A tractor mounted harvesting machine for a tractor having a wide tread rear axle structure, and in combination therewith a frame structure connected to the rear axle structure and having a portion extending forwardly thereunder, and plant guiding and gathering means carried by the frame structure and extending forwardly under the rear axle structure, said means being positioned to engage the plants substantially in transverse alinement with the rear wheels whereby said wheels function as a gauge means for the guiding and gathering means.

26. A tractor mounted harvesting machine for a tractor having a wide tread rear axle structure, and in combination therewith a frame structure connected to the rear axle structure and having a portion extending forwardly thereunder, means for vertically adjusting the frame structure relative to the tractor, and plant guiding and gathering means carried by the frame structure and extending forwardly under the rear axle structure, said means being positioned to engage the plants subetantially in transverse alinement with the rear wheels whereby said wheels function as a gauge means for the guiding and gathering means.

EDWARD A. JOHNSTON.